United States Patent

Anderson et al.

[11] Patent Number: 5,807,624
[45] Date of Patent: Sep. 15, 1998

[54] ELECTROSTATICALLY CHARGED IMAGING MANIFOLD

[75] Inventors: Dennis D. Anderson, Leander; Dwight L. Evans, Cedar Park, both of Tex.

[73] Assignee: Minnesota Mining and Manufacturing Company, St. Paul, Minn.

[21] Appl. No.: 632,822

[22] Filed: Apr. 16, 1996

[51] Int. Cl.$^6$ ........................................ B32B 3/00
[52] U.S. Cl. ..................... 428/195; 503/227; 442/394
[58] Field of Search .......................... 503/227; 428/195; 442/394, 395, 396, 397, 398

[56] References Cited

U.S. PATENT DOCUMENTS

| | | | |
|---|---|---|---|
| 3,618,752 | 11/1971 | Barker et al. | 206/57 |
| 3,691,140 | 9/1972 | Silver | 260/78.5 |
| 3,935,327 | 1/1976 | Taylor | 427/19 |
| 3,945,318 | 3/1976 | Landsman . | |
| 3,992,204 | 11/1976 | Taylor | 96/1.5 |
| 4,015,983 | 4/1977 | Schoonaer et al. . | |
| 4,059,471 | 11/1977 | Haigh | 156/244 |
| 4,067,056 | 1/1978 | Taylor et al. | 361/233 |
| 4,089,034 | 5/1978 | Taylor et al. | 361/233 |
| 4,106,933 | 8/1978 | Taylor | 96/1.5 R |
| 4,166,152 | 8/1979 | Baker et al. | 428/522 |
| 4,379,804 | 4/1983 | Eisele et al. | 428/332 |
| 4,599,265 | 7/1986 | Esmay | 428/355 |
| 4,684,264 | 8/1987 | Paperno et al. . | |
| 4,855,170 | 8/1989 | Darvell et al. | 428/40 |
| 4,879,161 | 11/1989 | Raymond et al. . | |
| 4,988,361 | 1/1991 | Kinberg . | |
| 5,134,198 | 7/1992 | Stofko, Jr. et al. | 525/205 |
| 5,260,849 | 11/1993 | Kasahara . | |
| 5,283,092 | 2/1994 | Everaerts et al. | 428/40 |
| 5,335,027 | 8/1994 | Lin et al. . | |
| 5,342,688 | 8/1994 | Kitchin et al. | 428/402 |

FOREIGN PATENT DOCUMENTS

| | | | |
|---|---|---|---|
| 0052938 | 6/1982 | European Pat. Off. | G03G 7/00 |
| HEI 2-54544 | 11/1990 | Japan | G03G 7/00 |
| 605 145 | 9/1978 | Switzerland | B41C 1/06 |
| 1145833 | 3/1969 | United Kingdom | B42D 5/00 |
| 1467349 | 3/1977 | United Kingdom . | |
| 2127747 | 4/1984 | United Kingdom | B44C 1/16 |

*Primary Examiner*—Marion E. McCamish
*Assistant Examiner*—J. M. Gray
*Attorney, Agent, or Firm*—Darla P. Fonseca

[57] ABSTRACT

An imaging manifold suitable for use in imaging devices such as electrostatic machines, ink jet, thermal transfer, and similar devices. Preferred imaging manifolds include a transparent, polymeric sheet imageable in an imaging device, and attached thereto, an opaque member underlying and in register with the transparent sheet. The opaque member is adhered to the transparent polymeric sheet by an electrostatic charge.

7 Claims, No Drawings

ELECTROSTATICALLY CHARGED IMAGING MANIFOLD

BACKGROUND OF THE INVENTION

1. Field of the Invention

This invention relates to an imaging manifold for use in imaging machines, including electrographic, ink jet, thermal transfer, and the like, comprising a transparent sheet and an opaque member adhered thereto by an electrostatic charge applied to the manifold or by the combination of such charge and a removable pressure-sensitive adhesive strip placed along one edge of the manifold.

2. Description of the Art

Transparencies for the projection of light images are well known and can be formed from a transparent film base and an image or print applied thereto by any of several well-known types of imaging machines.

Electrographic copying machines are well known and generally employ sophisticated mechanisms allowing them to select imaging sheets from a stack of sheets and by the use of rollers, wheels, belts, and the like, to cause such sheets to rapidly and precisely be moved past various points in the machine during the imaging process, producing a great number of copies in a relatively short time span. Such sophisticated mechanisms include sensing devices to prevent damage to the machine if wrinkling, tearing or other deformation of the sheets occurs by halting machine operations if jamming occurs. Many of these sensing mechanisms employ photo sensors which monitor the passage of the sheet through the machine. In order for such sensing mechanisms to register the presence of a sheet passing thereby, the sheets need to interrupt the beam of energy employed. Accordingly, when transparent sheet materials are used in these copying machines, they need to be rendered opaque in selected areas to operate properly in the copier.

The placement of such opaque areas varies depending on the position of the sensing mechanism in the machine. Some copying machines require that only a small portion of the transparent sheet be rendered opaque; a dark line along the top or side of such sheets is sufficient. Other machines require that a greater area of the sheet be rendered opaque or that prime image areas of the sheet be opaque or reflecting, which makes the use of imaging manifolds necessary.

Imaging manifolds comprise a transparent sheet and an opaque backing member, typically adhered by means of an adhesive. U.S. Pat. No. 3,618,752 discloses a stack of image receiving members, each being in contact with adjacent members. Each image member includes a generally rectangular, transparent, non-fibrous, flexible sheet, and a sheet of paper backing, substantially coextensive and in register with the non-fibrous transparent sheet, secured to the transparent sheet along a common leading edge or along either side edge alone or in a combination of the two. Generally, the paper sheet is adhered to the transparent sheet by a thin line of adhesive proximate a common edge of the mated sheets. The paper sheet can also be applied by other securing methods such as stapling and gluing. Optionally, the transparent sheet may be creased or scored so that when the transparent sheet has been imaged, the operator can tear the paper sheet from the transparent sheet and discard the paper sheet to leave a clean transparency.

The attachment of such paper backing sheets with an adhesive line has not provided totally satisfactory as an imaging manifold. When the paper sheet is torn from the transparent sheet, visible paper fibers usually remain on the transparent sheet in the area of the adhesive bond. When a discontinuous adhesive bond is used, for example a "dashed" adhesive line, the amount of paper fibers remaining on the transparent sheet following removal of the paper sheet is somewhat reduced.

A second more serious problem can develop in that such manifolds have a greater tendency than single sheets to jam in the feed mechanism of the copy machines. This is known as "scrunch", actually a failure of the juxtaposition of upper and lower sheets of the manifold.

EPO Patent Application 052938 specification discloses an imaging manifold wherein an adhesive is used which has a specified peel strength less than the tear strength of the paper backing. The adhesive has a greater affinity for the surface of the paper. This allows the paper sheet to be peeled from the transparent sheet without leaving a visible paper residue or any substantial amount of adhesive residue on the transparent sheet. Further, since the sheets of the manifold are preferably joined by a continuous line of adhesive, it has less tendency to jam in the feed mechanism of the copier. Adhesives taught to provide the characteristics noted above include natural rubber or synthetic rubber adhesives, vinylacetate polymers, ester-modified vinylacetate polymers, isooctyl acrylate/acrylamide copolymers in combination with a release agent, ethylene/vinylacetate copolymer hot-melt adhesives, and adhesives based on tacky, elastomeric, microspheres of the type disclosed in U.S. Pat. Nos. 3,691,140 and 4,166,152. These microspheres adhesives are particularly suitable for imaging manifolds because of their noted removability from a variety of surfaces without paper tearing.

U.S. Pat. No. 4,599,265 discloses a radiation cured removable adhesive composition comprising low levels of polar monomers copolymerized with alkylacrylates having from about 8 to 12 carbon atoms, and crosslinked to provide removability.

The above-mentioned removable adhesives are generally either solvent based or water based and are generally not amenable to on-line processing of the entire imaging manifold because of the complicated coating and drying processes involved in manufacturing imaging manifolds. In addition, radiation cured adhesives may require an inert atmosphere for curing. Drying may also result in a variety of problems. In traditional off-line processes, the backing sheet is usually coated with an adhesive at a separate and different area than where the transparent sheet is made. Because the adhesive is coated at a different location, there is a need for it to be transported as a stock roll. Therefore, the backing sheet is coated with a low adhesion backsize coating to facilitate the unwinding thereof Another drawback with traditional radiation processes is that the monomeric adhesive compositions coated onto backings such as paper tend to bleed into the paper causing the paper to deteriorate.

Hot melt adhesives are generally less complicated to process and therefore more amenable to in-line processing. However, most known hot-melt adhesives require high processing temperatures which require an extra step of cooling the adhesive prior to combination with the transparent imaging film.

Japanese Patent HEI[1990]-54544 discloses an image transfer film having paper, a film sheet, or cloth adhered to only the edge part of the side opposite to an image transfer side of a clear film by means of a pressure-sensitive adhesive.

The use of any form of adhesive adds to the cost of the product, consumes valuable resources, may cause health or environmental concerns during use or disposal, can affect recycleability of the product, and can impair the quality of the transparency by transferring adhesive residue to the transparent sheet. In addition, when the opaque backing is attached to the transparent, polymeric sheet with only a strip of adhesive, the backing can be laterally separated in the machine causing a misfeed which shuts down the machine. Current methods to resolve this misfeed problem are to use a special coated opaque backing, or to apply a special backside coating, to the transparent, polymeric sheet in order to increase the coefficient of friction between the sheet and the backing and thereby prevent the separation which leads to the misfeed.

The present invention overcomes the problems discussed above by using an electrostatic charge to generate an electrostatic attraction between the transparency sheet and the opaque member required for the manifold to pass through the machine.

Further, it has been found that the preferred constructions show considerable long term stability properties, in that surprisingly good adhesion may be observed after a years storage under ambient conditions.

In one embodiment, the manifold adheres the opaque member to the transparent sheet solely by means of an electrostatic charge; no adhesive or other bonding agent is used.

In a second embodiment, the opaque member is adhered to the transparent sheet by means of both an electrostatic charge and a pressure-sensitive adhesive.

SUMMARY OF THE INVENTION

The invention provides an imaging manifold, e.g., an opaque or transparent film having an attachment adhered to the film by means of electrostatic forces. The film may be formed from any film forming material, and the attachment may be a film forming material, paper, synthetic paper, nonwoven materials or the like.

In one embodiment, the film has an imaging surface, and an opposing surface, wherein said opposing surface has adhered thereto by means of electrostatic forces, an attachment.

More specifically, the present invention relates to an imaging manifold suitable for use in imaging devices such as electrophotographic machines, ink jet, thermal transfer, and the like. Preferred imaging manifolds comprise a transparent, polymeric sheet imageable in an imaging device, and attached thereto, an opaque member underlying and in register with said transparent sheet, said opaque member being adhered to said transparent polymeric sheet by means of an electrostatic charge.

The opaque member may be the same size as the film, or only a portion thereof.

In another embodiment, the invention relates to an imaging manifold suitable for use in imaging devices comprise a transparent, polymeric sheet imageable in an imaging device, and attached thereto, an opaque member underlying and in register with said transparent sheet, said opaque member being adhered to said transparent polymeric sheet by means of the combination of an electrostatic charge and a pressure-sensitive adhesive.

As used herein, these terms have the following meanings.

1. The term "electrostatic charge" is the presence at a surface of an excess or a deficit of electrons, sub-atomic particles that carry the unit of electric charge. Normally a surface will have neither excess nor deficit of electrons and is then considered electrically neutral.

2. The term "electrostatic forces" are forces between two such charged surfaces, if charged to the same polarity, repulsive forces will be observed. When an excess of electrons is present on one surface, and a deficit is present on the other, attractive forces will be observed. Both attractive and repulsive charges are a function of the distance between the regions.

3. The term "manifold" means an assembly of components, i.e., the transparent imeagable sheet, and opaque member, etc. in a unit.

4. The term "attachment" means the association of two or more components by any means to the extend that application of physical force is required to separate the components.

5. The term "core/shell latex polymer" means a polymer in spherical form wherein each discrete sphere has a core surrounded by a shell.

6. The term "(meth)acrylate" and the like, as used herein mean both the acrylate and methacrylate versions as well as substituted acrylates are included therein, 7. The term "antifriction polymeric particle" means a particle whose presence provides decreased friction to the surface to which it is applied.

8. The term "SIPN" means a semi-interpenetrating network.

9. The term "semi-interpenetrating network" means an entanglement of a homocrosslinked polymer with a linear uncrosslinked polymer.

10. The term "crosslinkable" means capable of forming covalent or strong ionic bonds with itself.

11. The term "mordant" means a compound which, when present in a composition, interacts with a dye to prevent diffusion of the dye through the composition.

12. The term "scrunch" means a failure of the desired juxtaposition of the components of the manifold.

All percents, parts and ratios herein are by weight, unless specifically stated otherwise.

DETAILED DESCRIPTION OF THE INVENTION

Manifolds of the invention comprise a transparent polymeric sheet, which may have a coating thereon to improve the quality of the deposited image. Such coating, if any, will be optimized for the specific type of imaging machine desired.

The manifold is charged by passing it through an electrostatic field. This field can be generated by any known electric charge generator, e.g., a corona charger, a tribocharger, conducting high potential roll charge generator or contact charger, a static charge generator, and the like. Samples should be charged with a DC charge or a DC charge followed by an AC charge in order to create an adequate level of charge adhesion between the two surfaces.

The electrostatic field at any point in space is the force that would be exerted on a unit charge placed at that point in space. This force would normally be expressed in dynes, and could be towards or away from the causing charge depending on the polarity of the latter. The Surface Potential is the work required to move unit charge from infinity to the surface. It is therefore proportional to the amount of charge present on the surface. Charge measurements are expressed as surface potential, in volts, as measured with a Monroe Isoprobe electrostatic voltmeter. The charge may be applied either to the transparent polymeric sheet, or to the opaque member of the manifold. The level of electrostatic charge applied to provide a sufficient bond between the imageable sheet and the attachment is at least about than 50 volts, preferably at least about than 200 volts. The charged portion of the manifold has a surface resistivity of at least about $10^{12}$ $\Omega$/square, preferably at least about $10^{16}$ $\Omega$/square.

Surprisingly, when the electrostatic charge is at the required level, the imaging manifold may be fed through an imaging device such as a copying machine without detaching. Further, the force holds the attachment securely, such that crumpling of the attachment, called "scrunching," does not occur.

The electrostatic force is long-lasting; the manifold may be stored for periods of up to one year or more, and still retain adequate charge to feed without scrunching or detachment occurring. A certain amount of charge deterioration does occur with aging; however, the deterioration is both slow and predictable. Exponential decay models predict that adequate adhesion to prevent detaching and scrunching should remain during storage for 1 year and more.

When it is desirable to use an electrostatic charge in combination with a pressure-sensitive adhesive, the pressure-sensitive adhesive is coated onto the backing, and then the charging process is effected.

Useful pressure-sensitive adhesives include inherently-tacky, elastomeric copolymer microspheres such as disclosed in U.S. Pat. Nos. 3,691,140 and 4,166,152; removable adhesives such as disclosed in U.S. Pat. Nos. 4,599,265, 4,855,170, and 5,283,092, all of which are incorporated herein by reference.

Preferably, the adhesive composition comprises:

1) from about 50 to about 90 parts by weight of at least one lower alkyl acrylate having an alkyl group comprising from about 4 to about 12 carbon atoms; and
2) from about 10 to about 50 parts by weight of at least one higher alkylacrylate having an alkyl group comprising from about 12 to about 26 carbon atoms.

Photocrosslinker may be added if necessary improve the cohesive strength of the adhesive in order to prevent substantial adhesive transfer to the imaging sheet. The photocrosslinker is preferably present from about 0.05% to about 1% by weight of the adhesive composition.

This preferred adhesive has high cohesive strength, high tack and high peel strength along with good removability. The adhesive further possesses low melt viscosity and can be easily used as a hot melt adhesive thereby allowing it to be used in an continuous processing line forming the composite imaging sheet.

The imageable sheet portion of manifolds of the invention typically comprises an image receptive coating the opposite side to that side which is electrostatically bonded to the attachment. These coatings vary in composition depending on the preferred imaging device. For use in ink jet imaging devices, the coating may comprise at least one crosslinkable polymeric component, and at least one liquid-absorbent component. Such crosslinked systems have advantages for dry time, as disclosed in U.S. Pat. No. 5,134,198 (Iqbal), incorporated herein by reference.

Preferably the ink-receptive layer comprises a polymeric blend containing at least one water-absorbing, hydrophilic, polymeric material, and at least one hydrophobic polymeric material incorporating acid functional groups. Sorption capacities of various monomeric units are given, for example, in D. W. Van Krevelin, with the collaboration of P. J. Hoftyzer, *Properties of Polymers: Correlations with Chemical Structure,* Elsevier Publishing Company (Amsterdam, London, New York, 1972), pages 294–296.

The water-absorbing hydrophilic polymeric material comprises homopolymers or copolymers of monomeric units selected from vinyl lactams, alkyl tertiary amino alkyl acrylates or methacrylates, alkyl quaternary amino alkyl acrylates or methacrylates, 2-vinylpyridine and 4-vinylpyridine. Polymerization of these monomers can be conducted by free-radical techniques with conditions such as time, temperature, proportions of monomeric units, and the like, adjusted to obtain the desired properties of the final polymer.

Hydrophobic polymeric materials are preferably derived from combinations of acrylic or other hydrophobic ethylenically unsaturated monomeric units copolymerized with monomeric units having acid functionality. The hydrophobic monomeric units are capable of forming water-insoluble polymers when polymerized alone, and contain no pendant alkyl groups having more than 10 carbon atoms. They also are capable of being copolymerized with at least one species of acid-functional monomeric unit.

Preferred hydrophobic monomeric units are preferably selected from certain acrylates and methacrylates, e.g., methyl(meth)acrylate, ethyl(meth)acrylate, acrylonitrile, styrene or a-methylstyrene, and vinyl acetate. Preferred acid functional monomeric units for polymerization with the hydrophobic monomeric units are acrylic acid and methacrylic acid in amounts of from about 2% to about 20%.

Preferably, the coating composition comprises a crosslinked semi-interpenetrating network, hereinafter referred to as an SIPN, formed from polymer blends comprising a) at least one crosslinkable polymeric component, b) at least one liquid-absorbent polymer comprising a water-absorbent polymer, and (c) optionally, a crosslinking agent. The SIPNs are continuous networks wherein the crosslinked polymer forms a continuous matrix. The SIPN is generated by crosslinking a copolymer containing from about 3 to about 20% ammonium acrylate groups with a crosslinking agent and then combining the copolymer with a liquid absorbent polymer or an uncrosslinked blend of the same polymer in combination with other ingredients. Useful crosslinkable polymers include acrylates, polymers having silanol groups, polymers containing gelation prevention groups and the like, as disclosed in U.S. Pat. No. 5,342,688, (Kitchin et al.), incorporated herein by reference.

The liquid-absorbent component can be selected from vinyl lactams, alkyl tertiary amino alkylacrylates, alkyl quaternary amino alkyl(meth)acrylates, commercially available water-soluble or water-swellable polymers such as polyvinyl alcohol, polyvinyl alcohol/poly(vinyl acetate) copolymer, poly(vinyl formal) or poly(vinyl butyral), gelatin, carboxy methylcellulose, hydroxyethyl cellulose, hydroxypropyl cellulose, hydroxyethyl starch, poly(ethyl oxazoline), poly(ethylene oxide), poly(ethylene glycol), poly(propylene oxide), and so on. The preferred polymers are poly(vinyl lactams), especially poly(vinyl pyrrolidone), and poly(vinyl alcohol).

Coating compositions for use as SIPNs, for ink jet coating preferably comprise a crosslinking agent, which may be a metal ion, a polyfunctional aziridine crosslinking agent, trifunctional alkylating agent, or other known crosslinking agent.

For plain paper copiers, the coating may comprise a film-forming polymer, copolymer or polymer blend which can be coated out of a water-based emulsion or aqueous solution, using any well-known coating technique. Such polymers can be made from any ethylenically unsaturated monomers, particularly $\alpha,\beta$-ethylenically unsaturated monomers, and can include acrylates and methacrylates, styrenes, substituted styrenes and vinylidine chlorides.

Preferably, the film forming polymer contains from 80 parts to 100 parts of at least one monomer selected from the group consisting of bicyclic alkyl (meth)acrylates, aliphatic alkyl (meth)acrylates having from one to twelve carbon atoms, and aromatic (meth)acrylates.

Useful bicyclic (meth)acrylates include, but are not limited to, dicyclopentenyl (meth)acrylate, norbornyl (meth) acrylate, 5-norborene-2-methanol, and isobornyl (meth) acrylate. Preferred bicyclic monomers include dicyclopententyl (meth)acrylate, and isobornyl (meth) acrylate.

Useful aliphatic alkyl (meth)acrylates include, but are not limited to, methyl acrylate, ethyl acrylate, methyl (meth) acrylate, isobutyl (meth)acrylate, isodecyl (meth)acrylate, cyclohexyl (meth)acrylate, and the like. Preferred aliphatic monomers include methyl (meth)acrylate, ethyl (meth) acrylate, and isodecyl (meth)acrylate.

Useful aromatic (meth)acrylates include, but not limited to benzyl(meth)acrylate and styrene (meth)acrylate.

The polymer can also contain from 0 to 20 parts of a polar monomer selected from the group consisting of alkyldioldi (meth)acrylates; hydroxyalkyl(meth)acrylates; alkyl (dialkoxy)silane; and nitrogen-containing compounds including N-alkylacrylamide, N,N-dialkyl monoalkyl amino ethyl (meth)acrylate, and their cationic salt thereof, N,N-dialkyl monoalkyl amino methyl (meth)acrylate, and their cationic salt thereof, N-alkyl amino alkyl (meth)acrylate, all said above alkyl groups having up to 12 carbon atoms, preferably up to 8 carbon atoms.

Preferred polar monomers include butanedioldiacrylate, hexanedioldiacrylate, hydroxyethylacrylate and methacrylate, N-methylacrylamide, n-butylmethacrylamide, N-methylolacrylamide, N-butylaminoethyl(meth)acrylate, N,N'-diethyl aminoethyl(meth)acrylate, and N,N'-dimethyl aminoethyl(meth)acrylate.

Preferred coating compositions for use with plain paper copiers contain at least one lubricating agent. Preferred lubrication agents are mono-substituted poly(oxyethylene) represented by the following structure:

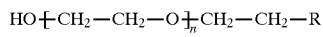

wherein n is an integer ranging from 5 to 200, preferably from 20 to 200; R is an alkylether, where the alkyl group is preferably a straight chain having from 6 to 25 carbon atoms, preferably from 12 to 25 carbon atoms. Another preferred lubricant is a poly-substituted poly(oxyethylenes), represented by the following general formula:

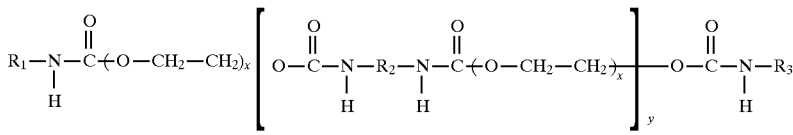

wherein X is an integer ranging from 50 to 500, preferably from 90 to 500, and Y is an integer ranging from 1 to 4; $R_1$, $R_2$, and $R_3$ are straight chained or branched alkyl groups, $R_1$ containing from 10 to 15 carbon atoms, preferably from 10 to 13 carbon atoms, $R_2$ containing from 10 to 24 carbon atoms, preferably from 12 to 18 carbon atoms, and $R_3$ containing from 5 to 40 carbon atoms, preferably from 7 to 36 carbon atoms.

Examples of straight chain alkylethers include stearyl ether, lauryl ether, cetyl ether, oleyl ether and decyl ether, preferably stearyl ether and lauryl ether, and most preferably, stearyl ether. These substances are available from ICI as Brij™ compounds.

Highly preferred coating compositions for plain paper copiers comprise a core/shell polymer. A coating formed from more compliant core/shell polymers allows the toner particles to come into contact with more surface area of the layer, while the lower $T_g$ of the core material aids a faster softening of the image-receptive layer with high $T_g$ shell at the high temperature of the fuser rollers, thus giving good toner adhesion.

In such an embodiment, the core is made from at least one $\alpha,\beta$-ethylenically unsaturated monomer having from 1 to 12 carbon atoms. This monomer makes up from 70 to 100 parts, preferably from 75 to 90 parts of the core. Where this monomer comprises less than 100%, the core also contains at least one monomer selected from the group consisting of bicyclic alkyl (meth)acrylates, and aromatic (meth) acrylates. This monomer can comprise up to about 40 parts, preferably from about 10 to about 25 parts.

The shell is likewise formed from at least one $\alpha,\beta$-ethylenically unsaturated monomer containing from 1 to 12 carbon atoms. This monomer may comprise up to 100 parts of the shell, preferably from about 45 to about 80 parts. Where this monomer comprises less than 100 parts, the shell can also comprise up to about 65 parts, preferably from about 20 to about 55 parts, of at least one monomer selected from the group consisting of bicyclic alkyl (meth)acrylates, and aromatic (meth)acrylates.

Useful $\alpha,\beta$-ethylenically unsaturated monomers include, but are not limited to, methyl acrylate, ethyl acrylate, methyl (meth)acrylate, isobutyl (meth)acrylate, isodecyl (meth) acrylate, cyclohexyl (meth)acrylate, n-butyl acrylate, styrene, vinyl esters, and the like. Preferred monomers include methyl (meth)acrylate, ethyl (meth)acrylate and isodecyl (meth)acrylate.

Useful bicyclic (meth)acrylates include, but are not limited to, dicyclopentenyl (meth)acrylate, norbornyl (meth) acrylate, and isobornyl (meth)acrylate. Preferred bicyclic monomers include dicyclopentenyl (meth)acrylate. Useful aromatic (meth)acrylates include, but not limited to benzyl (meth)acrylate.

The core polymer, and/or the shell polymer, can also contain from 0 to 20 parts of a polar monomer selected from the group consisting of acrylic (meth)acrylic acid; or hydroxyalkyl(meth)acrylates; and nitrogen-containing compounds including N-alkylacrylamide, N,N-dialkyl amino monoalkyl (meth)acrylate, N-alkyl amino alkyl (meth)

acrylate, and their cationic salts thereof, all said above alkyl groups having up to 8 carbon atoms, preferably up to 2 carbon atoms.

Preferred polar monomers include hydroxyethylacrylate and methacrylate, N-methylacrylamide, n-butylmethacrylamide, N-methylolacrylamide, N-butylaminoethyl(meth)acrylate, N,N'-diethylaminoethyl (meth)acrylate, N,N-dimethyl aminoethyl(meth)acrylate, N,N'-dimethyl amino ethyl (meth)acrylate, and isobutoxy (meth)acrylamide.

When these polar monomers are present in the shell polymer, the shell polymer is preferably crosslinked. Some of the polar monomers, e.g., n-methylolacrylamide and isobutoxy methacrylamide can undergo self-crosslinking during the drying stage, while others required an additional crosslinker to be present. Useful crosslinkers include polyfunctional aziridines such as trimethylolpropane-tris-(b-(N-Aziridinyl)propionate), Pentaerythritol-tris-(b-(N-aziridinyl)propionate), trimethylolpropane-tris-(b-(N-methylaziridinyl)propionate), and the like; ureaformaldehyde, melamine formaldehyde, isocyanate, multifunctional epoxy polymers, alkyldialkoxy silane, γ-aminopropyl trimethoxysilane, vinyl triethoxy silane, vinyl tris(b-methoxy ethoxy)-silane, vinyl triacetoxy silane, γ-methacryloxypropyltrimethyoxy silane, γ-(b-amino ethyl) aminopropyl trimethoxysilane, and the like.

Such coating compositions, whether for use with ink-jet printing devices or plain paper copiers, may also contain such known adjuvants as polymeric spheres or beads, antistatic agents, emulsifiers, coalescing agents, crosslinking agents, catalysts, thickeners, adhesion promoters, glycols, defoamers and the like.

Other known types of image receptive coatings are also useful when coated onto polymeric films and used in such manifolds. Coatings may be single layer, or a coating system comprising more than one layer may be used, e.g., the dual layer coating system of U.S. Pat. No. 4,379,804, incorporated herein by reference.

The ink-receptive coating(s) can be applied to the film backing by any conventional coating technique, e.g., deposition from a solution or dispersion of the resins in a solvent or aqueous medium, or blend thereof, by means of such processes as Meyer bar coating, knife coating, reverse roll coating, rotogravure coating, and the like.

Drying of the ink-receptive layer can be effected by conventional drying techniques, e.g., by heating in a hot air oven at a temperature appropriate for the specific film backing chosen. For example, a drying temperature of about 120° C. is suitable for a polyester film backing.

Film substrates may be formed from any polymer capable of forming a self-supporting sheet, and may be opaque or transparent, e.g., films of cellulose esters such as cellulose triacetate or diacetate, polystyrene, polyamides, vinyl chloride polymers and copolymers, polyolefin and polyallomer polymers and copolymers, polysulphones, polycarbonates, polyesters, and blends thereof. Suitable films may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-, 2,6-, and 2,7- naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates or backings are cellulose triacetate or cellulose diacetate, poly(ethylene naphthalate), polyesters, especially poly(ethylene terephthalate), and polystyrene films. Poly(ethylene terephthalate) is most preferred. It is preferred that film backings have a caliper ranging from about 50 μm to about 200 μm. Film backings having a caliper of less than about 50 μm are difficult to handle using conventional methods for graphic materials. Film backings having calipers over 200 μm are stiffer, and present feeding difficulties in certain commercially available ink jet printers and pen plotters.

When polyester film substrates are used, they can be biaxially oriented to impart molecular orientation, and may also be heat set for dimensional stability during fusion of the image to the support. These films may be produced by any conventional extrusion method.

To promote adhesion of the ink-receptive coating to the film backing, it may be desirable to treat the surface of the film backing with one or more primers, in single or multiple layers. Useful primers include those known to have a swelling effect on the film backing polymer. Examples include halogenated phenols dissolved in organic solvents. Alternatively, the surface of the film substrate may be modified by treatment such as corona treatment or plasma treatment.

Image-receptive sheets of the invention are particularly useful in the production of imaged transparencies for viewing in a transmission mode or a reflective mode, i.e., in association with an overhead projector.

The following examples are for illustrative purposes, and do not limit the scope of the invention, which is that defined by the claims.

TEST METHODS

Charge Generation using Corona Charger

In commercially available copiers, a thin wire is held at a very high potential (many thousands of volts), i.e., sufficient to ionize air molecules, which then are able to conduct electricity away from the wire. The recombination of the molecules with opposite charges generates light, which is the corona. It operates in effect as a charge "spray" device, placing electrical charge on whatever surface is close by. The normal purpose of such corona charge is to pull the toner particles away from the toner system drum, toward the paper upon which the image is to be formed. The applied voltage may be positive or negative, and the charge on the nearby surface will be appropriately signed. When an alternating voltage is applied to the wire, a corona discharge results, but no permanent charge is built up. However chemical or physical changes may be caused to the surface, which persist. In our experiments, alternating voltage coronas have not been effective.

For purposes of charge generation on manifolds of the invention, a Lanier® copier was modified by removing the toner system and the fuser roll assembly. All sensors were disabled. The positive transfer corona was used for charging the film. The photoconductor drum and the charging system therefore were not in use. This charging corona was set at "full on".

Electrostatic Charge Measurement

The effect of applying an electrostatic charge to the imaging manifold is measured by using an electrostatic volt meter. The voltmeter used was a Model 255 manufactured by Monroe Electronics. Samples of the imaging manifold are placed on a grounded metal plate. The transparent sheet is separated from the opaque backing and the meter is placed at a distance of one inch from the transparent sheet. The electrostatic voltmeter measures the surface voltage in KV.

Shear Force of Manifold Separation

Electrostatic charging of the imaging manifold induces forces of attraction which hold the two parts together. The force required to separate the two parts can be measured and used to document the level of attraction between the parts of the imaging manifold. The imaging manifold is charged by passing it through the electrostatic field. The sample is then cut into a 2.5 cm by 19 cm sample. About 2.5 cm of the length of the opaque backing is folded away from the transparent sheet and a hole is punched in the opaque backing. The sample is affixed to the movable platen of an Instrumentors SP-102B-3M90 Slip/Peel Tester (Strongville, Ohio) with two sided adhesive tape. The transparent sheet is toward the platen. The opaque backing is attached to a fixed MB-5 load cell. The test is initiated by starting the platen moving away from the load cell at a speed of six inches per minute. As the opaque backing separates from the transparent sheet, the peek static force applied to the load cell is displayed on a digital meter. The peak force recorded is the shear force required to separate the opaque backing from the transparent, polymeric sheet. The shear force is measured in grams per the area of the sheet ($41.2$ $cm^2$).

Scrunch Test

The scrunch is a functional measurement of improvement in feeding accomplished by the invention. Imaging machines which feed sheets from a stack are designed to remove one sheet from the stack at a time. In order to prevent multiple sheets from feeding, the machines are designed with a mechanism to restrain the next sheet in the stack. When the sheet being fed is comprised of two parts which are intended to feed simultaneously, the machine will attempt to feed one part while attempting to restrain the other. When the two parts are attached along the leading edge, the restrained part will be held in place and the part being fed will buckle under the feed force and wrinkle in accordion fashion. This is called scrunch. The tendency for an imaging manifold to scrunch varies by machine. One machine which routinely causes scrunch is the Xerox 1090. The Xerox 1090 was used to test for scrunch. The proper feed mode in the Xerox 1090 is for the transparent image sheet to be toward the feed belt. A more severe test is to place the side toward the feed belt that has the lowest beam strength. If the sample does not scrunch when fed in this manner, it indicates that the attractive forces induced are effective in reducing scrunch even in more severe circumstances. Conventional methods of preventing scrunch typically require surface treatments on one or both major surfaces, which adds cost.

EXAMPLE 1

Imaging manifolds consisting of a transparent imaging sheet with a commensurable opaque plain paper backing attached along one edge with an adhesive strip were passed beneath a DC corona for charging. Such imaging manifolds are commercially available as "3M Transparency Film for Plain Paper Copiers", Product Code PP2410. Charged samples were evaluated using the tests described previously. Samples were also aged two weeks at the conditions specified and retested for electrostatic charge and shear force. The results were compared to non-charged control samples and are shown in Table 1.

TABLE 1

| Conditions | Initial Surface Voltage KV | 2 week Surface Voltage KV | Initial shear force-gms/ 41.25 $cm^2$ | 2 week shear force- grams | Scrunch results Paper side toward feed belt |
|---|---|---|---|---|---|
| Ambient | 0.72 | 0.33 | 415 | 318 | 0 of 4 scrunched |
| 140 F./dry | 0.70 | 0.16 | 361 | 103 | 0 of 4 scrunched |
| 95 F./80% RH | 0.68 | 0.19 | 456 | 44 | 0 of 4 scrunched |
| Control | 0 | 0 | 0 | 0 | 3 of 3 scrunched |

EXAMPLE 2

Samples used in Example 2 were made in the same manner as example 1, except that the opaque paper backing was replaced with a polymeric backing coated with an opaque white coating. The samples were tested and compared to a non-charged control sample also having the opaque polymeric backing. The results are shown in Table 2.

TABLE 2

| Sample | Surface Voltage KV | Shear force gms/41.25 $cm^2$ | Scrunch results Opaque side toward feed belt |
|---|---|---|---|
| DC charged | 0.32 | 298 | 0 of 4 scrunched |
| Control | 0.03 | 0 | 4 of 4 scrunched |

EXAMPLE 3

Samples used in example 3 were made in the same manner as example 1, except that the opaque plain paper backing was replaced with a clay coated paper. The samples were tested and compared to a non-charged control sample also having the clay coated paper backing. The results are shown in Table 3.

TABLE 3

| Sample | Surface Voltage- KV | Shear force gms/41.25 $cm^2$ | Scrunch results Paper side toward feed belt |
|---|---|---|---|
| DC Charged | 0.43 | 181 | 0 of 4 scrunched |
| Control | 0.10 | 0 | 0 of 4 scrunched |

EXAMPLE 4

Samples used in Example 4 were produced in the same manner as example 1, except that the electrostatic charge induced was varied over a range to measure the effect on shear force, and to correlate shear force with scrunch. Additionally, the adhesive strip originally used to attach the paper to the transparent, polymeric sheet was removed by cutting approximately 1.27 cm from the adhesive edge. Therefore the imaging manifold was held together only by the electrostatic charges. Ten sheets were fed for the scrunch test. Electrostatic charge was not measured. The electrostatic charge is indicated as a percent of total charge based on the potentiometer set point which controls the electrostatic charge. Results are given in Table 4.

The results indicate that if shear force is at least 68 grams, scrunch performance is excellent and that the adhesive strip can be eliminated from the imaging manifold while maintaining feeding performance.

TABLE 4

| Charge conditions at feeding | Shear force gms/ 41.25 cm$^2$ | Scrunch results-paper toward feed belt |
|---|---|---|
| DC POT @ 100% | 396 | 0 of 10 scrunched |
| DC POT @ 75% | 68 | 0 of 10 scrunched |
| DC POT @ 50% | 21 | 2 of 10 scrunched |
| DC POT @ 25% | 9 | 5 of 10 scrunched |
| DC POT @ 0% | 7 | 6 of 10 scrunched |
| Control (sheets not fed) | 0 | 10 of 10 scrunched |

EXAMPLE 5

Samples used in Example 5 were produced in the same manner as example 1. Samples were conditioned at ambient and at 31° C./80% RH for 72 hours to determine the effect of high humidity on feeding performance. Samples aged at high humidity were placed in a plastic bag in the high humidity room and transported directly to the imaging machine and fed immediately. Samples were fed both in the normal mode which is with the transparent image side toward the feed belt and also with the plain paper side toward the feed belt. When the plain paper side is toward the feed belt, the scrunch test is a more severe test of feed performance. Two separate trials were made. The results of this trial indicate that electrostatically charged film can reduce scrunch under severe test conditions.

TABLE 5

| Imaging manifold | Ambient transparent side toward feed belt | 95 F./ 80% RH transparent side toward feed belt | Ambient opaque side toward feed belt | 95 F./ 80% RH opaque side toward feed belt |
|---|---|---|---|---|
| No electrostatic charging-trial 1 | 0 of 4 scrunched | 0 of 4 scrunched | 3 of 4 scrunched | 2 of 4 scrunched |
| Electrostatic charging-trial 1 | 0 of 4 scrunched | 0 of 4 scrunched | 0 of 4 scrunched | 3 of 4 scrunched |
| No electrostatic charging-trial 2 | 0 of 4 scrunched | 0 of 4 scrunched | 4 of 4 scrunched | 4 of 4 scrunched |
| Electrostatic charging-trial 2 | 0 of 4 scrunched | 0 of 4 scrunched | 0 of 4 scrunched | 0 of 4 scrunched |

EXAMPLE 6

Samples used in Example 6 were made in the same manner as example 1, except that an area of the charging corona was masked with Teflon® tape so that only part of the sheet was charged. Specifically, a section of the imaging manifold 6.3 cm wide was charged. The adhesive strip was removed prior to feeding of the sheet into the imaging device. Some samples were fed with the transparent, polymeric sheet positioned toward the feed belt and some were fed in the more difficult feeding mode, i.e., with the plain paper toward the feed belt. The shear force was measured in 2.5 cm intervals across the sheet to determine the effect of masking the corona. The results are shown in Tables 6 and 7.

The imaging manifolds fed in either mode. This, and the continued shear force values demonstrate that the masking of the corona was effective in controlling the area of charging.

TABLE 6

| Sample | Scrunch results when fed with the transparent sheet toward the feed belt | Scrunch results when fed with the plain paper toward the feed belt |
|---|---|---|
| Charged only on 2.5 inches along one edge--adhesive strip removed | 0 of 4 scrunched | 0 of 4 scrunched |

TABLE 7

| 1.27 cm adhesive stripe | First 1.27 cm masked | Second 1.27 cm masked | Third 1.27 cm masked | Fourth 1.27 cm masked | Fifth 1.27 cm masked | Sixth 1.27 cm approx. ½ masked | Seventh 1.27 cm not masked | Eighth 1.27 cm not masked |
|---|---|---|---|---|---|---|---|---|
| Remove and discard | 0 | 0 | 0 | 0 | 0 | 54 | 395 | 239 |

EXAMPLE 7

Samples used in example 7 were made in the same manner as example 1 and were passed beneath a DC corona for charging. These imaging manifolds are commercially available as "3M Transparency Film for Plain Paper Copiers," Product Code PP2410. The adhesive edge was removed from the samples and the charged samples were imaged through a Hewlett-Packard LaserJet® III printer. This printer will accept either a transparent sheet or a transparent sheet with an opaque backing. Control samples had the adhesive edge removed but were not electrostatically charged. The results are shown in Table 8. Samples which were charged fed through completely intact. Samples which were not charged did not feed intact; each transparent sheet and each paper backing sheet fed independently through the printer. All samples were stack fed from the paper tray.

TABLE 8

| Sample | Feed results |
|---|---|
| Electrostatically charged manifold--adhesive removed | 10 of 10 imaging manifolds fed through the printer intact |
| Non-charged manifold--adhesive removed | 0 of 10 imaging manifolds fed through the printer intact |

EXAMPLE 8

Imaging manifolds according to the invention, consisting of a transparent imaging sheet with a commensurable opaque polymeric backing attached along one end with an adhesive strip were passed beneath a DC corona for charging. This film is 31.27 cm in length with a perforation 3.33 cm from the end such that after imaging the 3.33 cm area is detached along the perforation leaving a standard 27.9 cm long sheet. The adhesive is located in this 3.33 cm area such that after removal the transparent image sheet is no longer adhered to the polymeric backing sheet. These imaging manifolds are commercially available as "3M Transparency Film for Tektronix Phaser® 200/220 Series® Printers"; Product Code CG3650. After charging, the 3.3 cm adhesive containing edges were removed and the samples were fed through a Tektronix Phaser® 220e® thermal transfer printer. Non-charged imaging manifolds were also fed through the printer after removal of the 3.33 cm adhesive containing edges. The results are given in Table 9. In samples without the electrostatic charge, the transparent imaging sheet was separated from the opaque polymeric backing sheet.

TABLE 9

| Sample | Feed results |
|---|---|
| Electrostatically charged manifold--adhesive removed | 4 of 4 imaging manifolds fed through the printer intact |
| Non-charged manifold--adhesive removed | 0 of 4 imaging manifolds fed through the printer intact |

EXAMPLE 9

Samples used in example 9 were made in the same manner as example 1 and were passed beneath a DC corona for charging. These imaging manifolds are commercially available as "3M Transparency Film for Plain Paper Copiers"; Product Code PP2410. These samples were stored at ambient conditions and used to measure the change in shear force over time. The results are shown in Table 10. The results indicate that the shear force does not deteriorate appreciably over the time span covered by these examples.

TABLE 10

| Elapsed time from electrostatic charging until shear force measurement--in days | Shear force gms/41.25 cm$^2$ (average of ten measurements) |
|---|---|
| 0.01 | 427 |
| 0.04 | 421 |
| 0.12 | 489 |
| 4.80 | 459 |
| 12.0 | 415 |
| 24.6 | 366 |

EXAMPLES 10 AND 11C

3M® "PP2410" is a PET film/paper laminate with an imagable coating on the exterior surface of the manifold, and plain PET in contact with the paper. A strip of adhesive attaches one edge of the film to the paper.

The paper backing was delaminated from a sample of "PP2410," and the film was passed through a modified Lanier copier, with the non-coated side of the film exposed to the transfer corona. A piece of 12 μm stripe (plain PET on 1 side, white ink on the other) size 19 cm long and 3.2 cm wide was contacted with the film PET surface to PET surface, and a 11 kg rubber roll run over the sandwich. Using the Imass shear tester, one end of the stripe was raised (about 2.5 cm) and attached to the Imass clip. Peak shear force during the removal of the stripe was recorded. A removal force of 385 g/25 mm was recorded as an average of 4 runs.

As Comparative Example 11C, the process was repeated except that no corona treatment was imparted to the imagable film. A removal force of 16 g/25 mm was observed. This demonstrates the improvement in adhesion resulting from the corona treatment.

What is claimed is:

1. An imaging manifold comprising a transparent, polymeric sheet having an imaging surface and an opposing surface, bearing an image receptive coating on said imaging surface imageable in an imaging device, and attached to said opposing major surface, an opaque member underlying and in register with said transparent sheet, said opaque member being adhered to said transparent polymeric sheet by means of an electrostatic charge, said charge being sufficient that said imaging manifold may be fed through an imaging device without said opaque member detaching or scrunching.

2. An imaging manifold according to claim 1 wherein said opaque member comprises a fibrous web.

3. An imaging manifold according to claim 1 wherein said opaque member comprises a polymeric sheet.

4. An imaging manifold according to claim 1 wherein said opaque member has a charged major surface, said charge not being uniform over said major surface.

5. An imaging manifold comprising a transparent, polymeric sheet having an imaging surface and an opposing surface, bearing an image receptive coating on said imaging surface, imageable in an imaging device, and attached to said opposing major surface, an opaque member underlying and in register with said transparent sheet, said opaque member being adhered to said transparent polymeric sheet by means of a combination of an electrostatic charge, and a pressure-sensitive adhesive, said combination being sufficient that said imaging manifold may be fed through an imaging device without said opaque member detaching or scrunching.

6. An imaging manifold according to claim 5 wherein said pressure-sensitive adhesive comprises inherently-tacky, elastomeric copolymer microspheres.

7. An imaging manifold according to claim 6 wherein said pressure-sensitive adhesive composition comprises:

1) from about 50 to about 90 parts by weight of at least one lower alkyl acrylate having an alkyl group comprising from about 4 to about 12 carbon atoms; and 2) from about 10 to about 50 parts by weight of at least one higher alkylacrylate having an alkyl group comprising from about 12 to about 26 carbon atoms.

* * * * *